United States Patent [19]

Perville et al.

[11] Patent Number: 4,832,512

[45] Date of Patent: May 23, 1989

[54] PLOTTING MACHINE

[75] Inventors: Jacques Perville, Fontenay Sous Bois; Thierry Lasjaunias, Paris; Jean-Claude Dard, Villemomble; Rémy Jaffres, Unieux, all of France

[73] Assignee: Benson S.A., Creteil, France

[21] Appl. No.: 55,699

[22] Filed: May 29, 1987

[30] Foreign Application Priority Data

May 29, 1986 [FR] France .................. 86 07742
May 29, 1986 [FR] France .................. 86 07743

[51] Int. Cl.$^4$ .......................... B41J 25/30
[52] U.S. Cl. ........................ 400/18; 400/320;
400/322; 400/354; 346/139 R
[58] Field of Search ............ 400/320, 320.1, 322, 400/354, 354.1, 354.2, 354.3, 16, 17, 18, 21, 568, 648, 649, 328, 642, 691, 693; 346/106, 112, 113, 118, 136, 139 R, 139 D, 141

[56] References Cited

U.S. PATENT DOCUMENTS

| | | | |
|---|---|---|---|
| 3,356,199 | 12/1967 | Robinson | 400/328 X |
| 4,072,101 | 2/1978 | Garcia et al. | 400/320 X |
| 4,177,471 | 12/1979 | Mitchell | 400/320 X |
| 4,369,453 | 1/1983 | Brandt | 346/136 |
| 4,445,798 | 5/1984 | Munehiro | 400/322 X |
| 4,511,905 | 4/1985 | Ulvila | 400/17 X |
| 4,512,505 | 4/1985 | Westly et al. | 346/136 X |
| 4,526,486 | 7/1985 | Kikuchi et al. | 400/322 X |

FOREIGN PATENT DOCUMENTS

| | | |
|---|---|---|
| 411601 | 1/1969 | Australia . |
| 2633709 | 10/1977 | Fed. Rep. of Germany . |
| 3115416 | 11/1982 | Fed. Rep. of Germany ...... 400/320 |
| 2009933 | 6/1979 | United Kingdom . |
| 2161758 | 1/1986 | United Kingdom ................ 400/691 |

OTHER PUBLICATIONS

Patent Abstracts of Japan, vol. 6, No. 125, Jul. 10, 1982→Jap. Pat. Pub. 57-52818, 3/1982.
Hewlett-Packard Journal, vol. 32, No. 10, Oct. 1981.

Primary Examiner—Charles Pearson
Attorney, Agent, or Firm—Ladas & Parry

[57] ABSTRACT

The structural base unit of the machine is made of a one-piece shaped beam (40) which extends along a first direction (Y) with a first portion (41) which, due to its own stiffness, supports and guides the carriage (12) carrying the writing head (11) along its translational motion in the first direction (Y), and with second and third portions (45) which defines supporting surfaces for the drum (20) driving the printing medium in a second direction (X) perpendicular to the first direction (Y). Guiding of the carriage (12) is ensured by rails (43, 44) formed integral with the beam or attached to it, and a slot (50) cut in the shaped beam (40) along the action area of the writing head for providing a passage for the printing medium and its engagement with the drum (20).

9 Claims, 3 Drawing Sheets

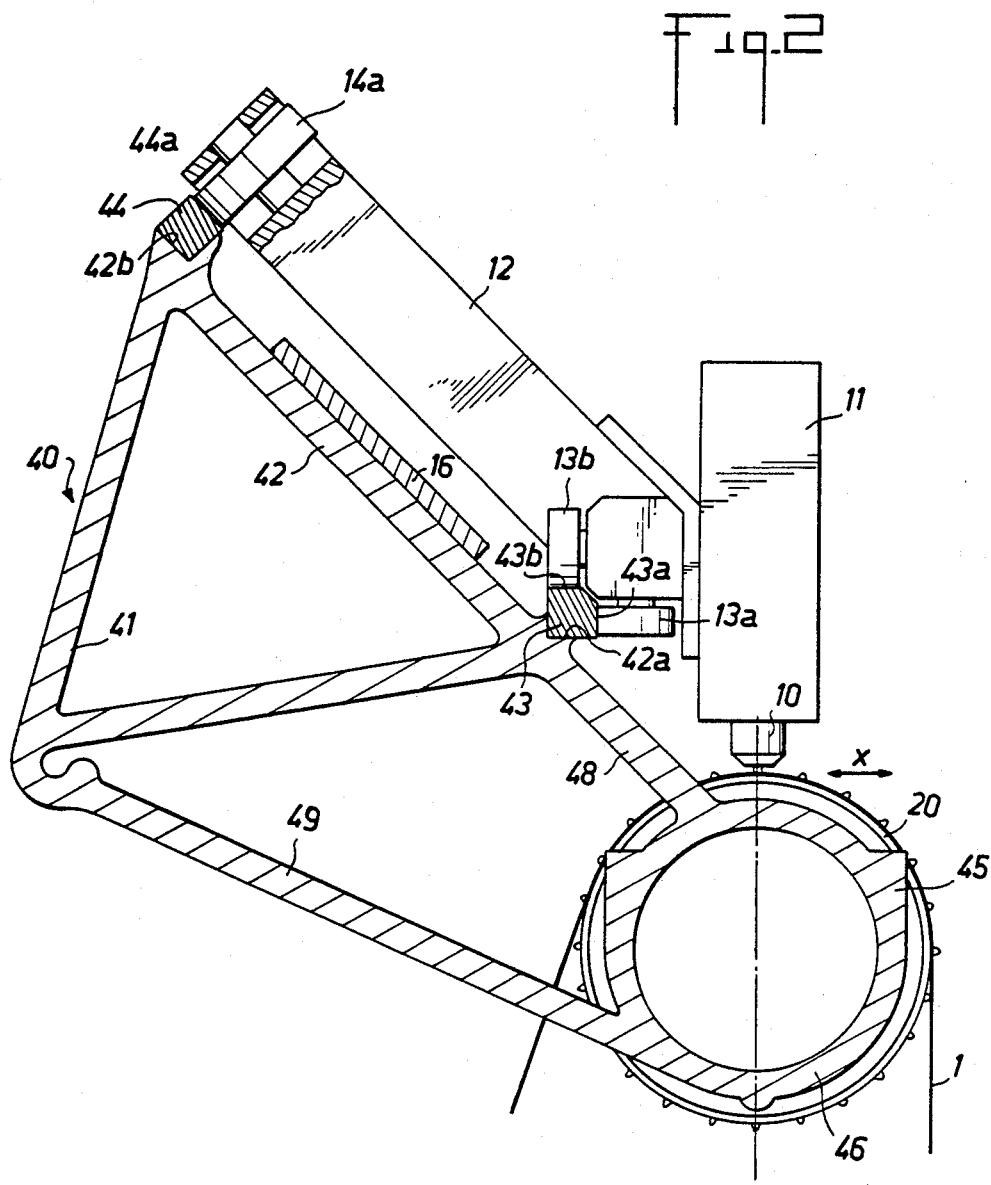

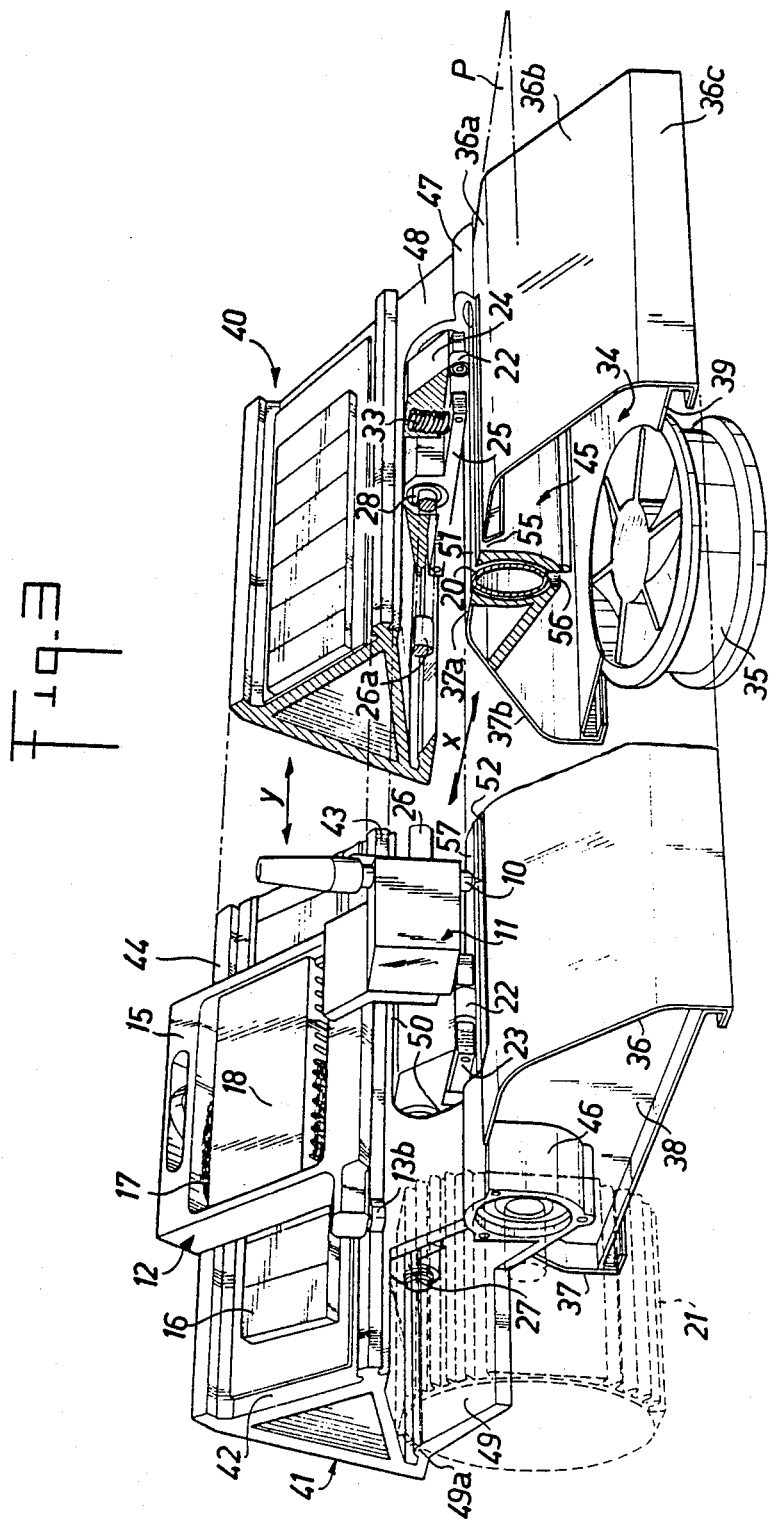

PLOTTING MACHINE

This invention relates to an X, Y plotting machine and more specifically to such a machine which comprises a carriage supporting a writing head, a device for guiding the carriage along a first direction, carriage driving means for moving the same along said first direction, a member rotatably movable about an axis which is parallel to the first direction, this member being engageable with a writing medium, and means for driving said rotatably movable member for moving the writing medium along a second direction perpendicular to the first direction.

In such a machine, a drawing is printed on the writing or printing medium, such as a paper sheet, by combining the motion of the writing head along the first direction (Y) with the motion of the printing medium in the second direction (X).

In commercially available machines of this type, the Y and X driving means comprise rotating electric motors linked respectively by motion transmitting devices to the carriage which holds the writing head and to the rotatably movable member or drum which engages the printing medium which is for example a paper sheet. Usual motion transmitting devices comprise reducers with gears or belts for driving the drum, and cables, metal strip or notched belt for driving the carriage.

These known transmitting devices have several drawbacks.

First they include an important number of parts which make the apparatus more expensive and more difficult to assemble.

Secondly the movements initiated by the motors are transmitted to the carriage and to the printing medium with errors which are due to the successive clearances and elasticities of the transmitting devices Thus the accuracy of the movements of the writing head and the writing medium with respect to the displacement control signals applied to the motors is considerably reduced.

A first object of the present invention is to provide a plotting machine wherein exact orthogonality between said directions is ensured, which condition is necessary for accurate and reproducible plots to be obtained. The invention also aims at fulfilling this condition without the need to carry out careful adjustments of relative positions of the machine components The invention has a further object to provide a simplified machine structure which allows ready construction and assembly of its various members.

Another object of the present invention is to provide a plotter in which the previous drawbacks are reduced. More particularly the present invention provides a plotter wherein the driving means on axes X and Y have a dynamic behaviour which is considerably improved resulting in a more accurate drawing.

These and other objects of the invention are attained in one embodiment, by a machine comprising a one-piece shaped beam extending along a first direction Y with a first portion which, due to its own stiffness, supports and guides the writing head carriage as it moves in the first direction (Y), and with second and third portions which define bearing surfaces for the writing medium drum member.

Integrating both carriage guiding and supporting of the drum which engages the printing medium into a single one-piece shaped structure, ensures the required orthogonality and stability of the X and Y directions. Moreover, such a base structure can be obtained in a simple fashion by cutting the shaped beam to the desired length according to the size of the machine, which results in cost reductions in mass production of the machines, even with different formats.

For providing a passage for the printing medium between the first portion of the beam and the drum, a slot is advantageously cut in the beam along the active area of the writing head.

Carriage guiding is ensured by one or more guide rails made integral with the beam or supported thereon. In the latter case, the stiffness of the rails is imparted by the beam along which the rails are attached, for instance by glueing.

Each supporting surface of the printing medium drum member is defined by a cylindrical surface of the shaped beam.

The printing medium drum member for example comprises driving pins for continuous paper-feed. In the case of a single-sheet feed plotting machine, the paper sheet is for example friction-driven along its edges while being pressed on the machine through depression.

The carriage is advantageously driven by means of a linear motor. The latter can for example be formed of an armature mounted on the carriage and cooperating with an inductor comprising a row of magnets aligned in the carriage translational direction and attached to one face of the shaped beam which is longitudinally bounded by two carriage guide rails.

According to another aspect of the invention, the carriage which supports the writing head and the rotatable driving member which engages the printing medium are directly coupled to the moving portion of the electric motors.

Preferably, as indicated above, the motor which drives the carriage is a linear electric motor the moving portion of which, for example the armature, is fixed to the carriage, while the non movable portion is disposed parallel to the Y direction. The second motor is a rotating electric motor having a rotor engaging directly the drum of the printing medium. With this arrangement, the carriage and the printing medium drum are each driven directly by an electric motor without any intermediate transmitting device.

Compared to the plotters of the prior art, in which such transmitting devices are used, the plotter of the invention eliminates almost completely the effect of clearances and frictions between the motors and the corresponding driven elements (writing head and printing medium) with a minimum inertia of the moving parts.

Then, on both X and Y axes, the driving mechanisms can follow more exactly and more quickly the control signals which are sent to the motors. Consequently, the invention allows fabricating graphic machines with high accuracy since the driving mechanisms are able to be activated by high quality servomechanisms and to use the high performances of these servomechanisms without introducing errors. Furthermore, these driving mechanisms in which the transmitting devices are eliminated, have characteristics which do not change. Another advantage is that the total number of parts of these driving mechanisms is reduced resulting in a more simplified structure which is easier to assemble and has a lower cost.

From U.S. Pat. No. 4,445,798 it is well known to use a linear motor to drive a printing head in a printer. In this apparatus, the printing head scans the printing medium on its whole width at one stroke and the printing medium is displaced in one direction only. This is not the case for a plotter. The driving problems encountered in plotters are completely different because the X and Y displacements must be coordinated to produce the drawing as a succession of portions of lines, generally a succession of straight lines having different directions, as quickly and as accurately as possible.

This invention will be more fully understood in accordance with the following description taken together with the attached drawings, wherein:

FIG. 2 is a partial enlarged view of a cross-section showing the profile of the beam of the machine in FIG. 1, and FIG. 3 is a perspective view of a second embodiment of a machine according to the invention.

Figure 1:
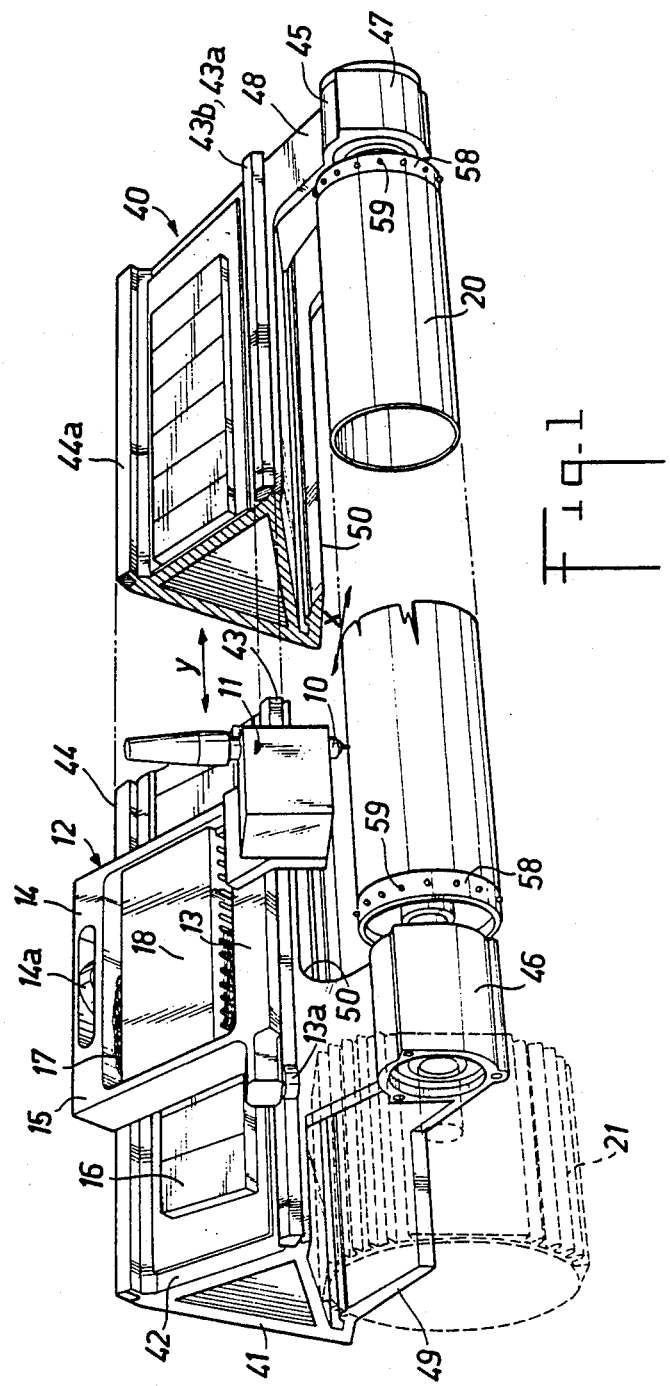
FIG. 1 is a perspective view of a first embodiment of a plotting machine according to the invention.

Reference will first be made to FIGS. 1 and 2 which illustrate an embodiment of a continuous paper-feed plotting machine according to the invention.

In such a machine, plotting on a length of paper 1 (only shown in FIG. 2) unrolled from a roll of paper (not shown), is performed by a combination of the straight linear motion in direction Y of a writing member 10 carried by a writing head 11 and of the translational motion in direction X of the paper length 1 which passes over a rotating drive drum 20.

The base structural unit of the machine comprises a one-piece beam 40 formed of a shaped metal section, for instance of aluminum, obtained by extrusion. Beam 40 extends parallel to the Y axis. More specifically, it comprises a first portion 41 which particularly forms a guiding and supporting structure for carriage 12 which in turn carries the writing head, and a second portion 45 forming a support and guide structure for rotating drum 20.

In the illustrated example, the first portion 41, which forms the upper rear part of beam 40, is tubular and has a triangular cross-section with a front face 42 which is angled with respect to horizontal, for example, by an angle substantially equal to 45°. Face 42 is longitudinally bounded, along both edges of portion 41 between which it is located, by two guide and support rails 43, 44 for carriage 12, which extend parallel to the Y axis.

Carriage 12 comprises a rectangularly shaped frame portion 15 with two opposite sides 13, 14 located in front of rails 43, 44 parallel to said rails. Rail 43 which is located on the front side of the machine has two guiding flat faces 43a, 43b which are vertical and horizontal, respectively, over which rollers 13a, 13b attached to carriage 12 can roll. Both rollers 13a, 13b are mounted to freely rotate on two extensions of side 13 of the carriage. Rail 44 parallel to rail 43 is located on the rear side of the machine at a vertical level higher than that of rail 43. Rail 44 has a flat guiding face 44a parallel to face 42 and over which passes a roller 14a, which is mounted to rotate freely in an aperture formed substantially in the middle of side 14 of the carriage.

In the illustrated example, rails 43, 44 are made of rectangular cross-section bars or flexible ribbons attached to beam 40, such as by glueing. Rails 43, 44 are provided within grooves 42a, 42b of V-cross-section formed along both longitudinal edges of face 42. The faces of grooves 42a, 42b are first ground, before the rails are mounted, so as to form the reference surfaces for guiding carriage 12 along direction Y. Rails 43, 44 are for example, made of steel or any other material able to withstand without damage repeated rollings of carriage 12, and beam 40 upon which they rest gives them the required stiffness.

Alternatively, if allowed by the material of which the beam is made and by the conditions of use of the machine, rails 43, 44 can be made integral with beam 40.

Obviously, portion 41 of beam 40 can have any shape other than the above-described one, provided that it supports or at least always has a rail extending in direction Y for guiding and supporting carriage 12.

The second portion 45, which forms the lower front part of beam 40, is tubular and has at its ends, steps 46, 47 having bearing receiving surfaces for supporting drum 20 as it rotates about its own axis, parallel to direction Y.

The ground internal surfaces of steps 46, 47 act as guides for the drum 20 as it rotates, and therefore, for printing medium 1 in direction X.

In the illustrated example, steps 46, 47 are entirely formed by a tubular part of beam 40. Alternatively, steps 46, 47 could be made of two parts: a first half-cylindrical part formed by the beam and defining the drum axis, and a second half-shell shaped part attached to the beam.

Walls or webs 48, 49 couple portion 45 to portion 41 of the beam. Wall 48, along one of its longitudinal edges, adjacent to the top of tubular portion 45, is connected to the rear of said top, and along the other longitudinal edge, to the edge of portion 41 where rail 43 is located. As shown in FIG. 2, wall 48 is substantially placed as an extension of face 42. As to face 49, it joins the edge of portion 41 opposite face 42, along one of its longitudinal edges, at the bottom and rear part of tubular portion 45, and along the other longitudinal edge.

A slot 50 is formed in beam 40 for allowing passage of the paper tape 1 by completely removing the section of portion 45 between steps 46 and 47 to produce an open space between the steps 46 and 47 in front of back portion 41 of the beam where drive drum 20 is located, between steps 46, 47. As shown in FIG. 1, slot 50 extends from the upper part of tubular portion 45 into wall 48 and, downwards, until tubular portion 45 entirely disappears between steps 46, 47.

The slot length 50 is at least equal to that of the action area of writing head 11, that is at least slightly greater than the length of drum 20.

Printing on the length of paper 1 is carried out along the upper generating line of drum 20. At its ends the drum comprises rings 58 provided with pins 59 for engaging with holes located on both sides of the paper length. Pressing of the paper against drum 20 is done by means exerting a tension force on the paper along its path before and after the writing area.

Means, such as electromagnetic means (not shown) are provided for moving writing member 10 between an upper (rest) position and a lower (working) position, either through relative displacement of the writing member 10 with respect to head 11, or through displacement of writing head 11 with respect to carriage 12. Such writing member down- or up-motion control means are well known and need not be described in detail here.

Displacement of paper length 1 in direction X is ensured by rotation of drum 20. Rotating of the drum is provided by an electric motor 21 (illustrated in dotted line on FIG. 1) fixed to the beam at one longitudinal end thereof. The output shaft of motor 21 and drum 20 are coaxial and directly coupled to one another.

Displacement of the writing head in direction Y is done by driving the carriage according to a translational motion, by a linear motor whose inductor is formed by a row of permanent magnets 16 which are aligned along direction Y and fixed to face 42 of the beam in front of the path of carriage 12. The inductor cooperates with coiled armature 17 wound on a magnetic circuit 18 supported by frame 15 of carriage 12.

Driving of carriage 12 is thus directly performed, that is, without any transmission members between a motor and the carriage, just as for drum 20. This results in a maximum simplification of kinematics due to the reduction in the number of pieces. Direct application of motions occurs with neither looseness (due to usual clearances) nor resilience, with optimal static and dynamic accuracy for X and Y motions.

Preferably, the linear motor which drives the carriage and motor 21 which drives the drum, are chosen so as to accommodate identical control electronics. Both of them can for instance be brushless direct current motors. Due to the direct drive, one thus obtains identical responses to the X and Y displacement control signals.

In addition to the above advantages, the integration of support and guide functions for the carriage and the drum into a one-piece structure is an additional advantage. It is thus possible to maintain the required accuracy in the orthogonality between directions X and Y during the whole period of use of the machine without adjustment or differential expansion problems which could be encountered in the case where the above functions are performed by different devices.

Moreover, fabrication of the base structure of the machine requires a minimum amount of operations, which essentially consist in cutting a shaped metal section at the desired size (the metal section being advantageously a standard one for the whole range of machines), and machining the surfaces which guide the carriage and the drum.

Such advantages can also be obtained with a plotting machine fed with successive paper sheets such as that shown in FIG. 3.

Items which have the same functions in the machines of FIGS. 1 and 3 are identified by the same reference numerals.

In the machine of FIG. 3, plotting is performed on a pre-cut paper sheet by a combination of the translational motion of writing member 10 in direction Y and translational motion of the paper sheet in direction X under the action of drive drum 20 against which the sheet is pressed by means of pressure rollers.

The base structural unit of the machine is made of beam 40 which has the same profile as the beam in the machine described in reference to FIG. 1. Rails 43, 44 for supporting carriage 12 which carries writing head 11, are used here again. In the front portion 45 of the beam, steps 46, 47 having surfaces for rotatably supporting drum 20 are also identical to those previously described.

The passage for the sheet through the machine is formed by the slot 50 cut within the upper part of tubular portion 45 of the beam and extending into wall 48. Slot 50 is formed on only one part of the length of beam 40 and does not terminate at the longitudinal ends thereof. The length of slot 50 is at least equal to that of the action area of writing head 11, that is, at least slightly greater than the maximum width of the paper sheet that can be accommodated in the machine.

Contrary to the embodiment of FIG. 1, slot 50 does not extend down to the bottom of tubular portion 45, but is bounded by a horizontal plane P which is located slightly lower than the horizontal plane containing the upper generating line of drum 20. Thus, between steps 46, 47, the tubular portion 45 has an elongated aperture 51 through which drum 20 slightly projects upwards. On the front side, aperture 51 is bounded by an edge whose horizontal face 52 lies in a plane P which forms the rest surface of the sheet in the action area of the writing head. On the rear side, the aperture 51 is bounded by another horizontal edge 57 on which the sheet can rest behind the writing area. It should be noticed that the wall of tubular portion 45 has an increased thickness at the level of plane P, in order to provide sufficient width to the supporting faces 52 and 57 within the working area of the writing head.

A slot (not shown) corresponding to slot 50 is cut in wall 49 so as to provide a passage for the sheet in the rear part of the machine.

Displacement of the paper sheet in the X direction is performed by rotating drum 20 which cooperates with two pressure rollers 22 exerting a pressure force upon the edges of the sheet, and tend to press them against the drum.

Rotation of drum 20 is ensured by electric motor 21 fixed to beam 30 at one longitudinal end thereof. The output shaft of motor 21 and drum 20 are coaxial and directly coupled to one another.

Pressure rollers 22 are each mounted to freely rotate at an end of a respective arm 23 which is made of two parts 24, 25 articulated relative to each other.

The first part 24 has a beak-shaped rear end which adapts to a horizontal rib 49a on the rear part of wall 49 on the inside face thereof. Connection between part 24 and beam 40 is made by means of a horizontal rod 26 extending parallel to the Y axis and supported at its ends by steps 27 attached to the internal side of wall 48.

The other part 25 of each arm 23 forms a lever articulated relative to part 24 about an axis located to the rear of the arm and carrying a roller 22 at its forward end.

The pressure force of roller 22 against drum 20 is generated by a spring 33 with its ends placed into recesses formed in the faces located in front of part 24 and lever 25 forward of arm 23. Spring 33 is normally in the compressed state to produce a force which tends to bias lever 25 downwards relative to part 24 of arm 23.

Engagement of sheet 1 between drum 20 and pressure rollers 22 is done by lifting levers 25 relative to parts 24 against the bias force exerted by springs 33. Rod 26 has cams 28 acting upon levers 25. In that way, simultaneous lifting of pressure rollers 22 for the introduction of a sheet in the machine, can be controlled by causing the rod to rotate on itself by half a turn, for example by means of an actuation member (not shown) integral with rod 26 at one end of beam 40.

In order to maintain sheet 1 against the rest face 52 during a printing operation, a partial vacuum is generated under the lower face of the sheet. To this end, a pressure lower than atmospheric pressure is maintained within a chamber 34 by means of a suction device such as a blower 35. Chamber 34 is bounded by two side walls 36, 37 which extend parallel to direction Y, two vertical end walls 38 perpendicular to direction Y and a bottom wall 39 in which a passage is formed where blower 35 is mounted.

Walls 36, 37 are joined to beam 40 on each side of its tubular portion 45. On the forward side, wall 36 has a horizontal part 36a whose upper surface lies in the same plane as the rest face 52 and which is prolongated forwards by a part 36b sloping downwards, with which it gradually joins. Part 36b itself then gradually joins a terminal vertical part 36c or wall 36. On the rear side, wall 37 has a shape which is symmetrically disposed with wall 36 with respect to the vertical plane which passes through the drum axis 20. More particularly, wall 37 has a horizontal part 37a whose upper surface lies in the same plane as the edge 53 which is connected to a sloped part passing through the aperture provided for the passage of the sheet through wall 49.

Wall 37 is tightly coupled along its whole length to tubular portion 45 of beam 40. However, over a length slightly greater than that of drum 20 between steps 46, 47, wall 36 forms a space 55 relative to beam 40, through which chamber 34 communicates with the outside, along rest surface 52. It can also be noted that through-holes 56 are formed in tubular portion 45 of the beam for communicating chamber 34 with the inside space of this tubular portion containing drum 20, and therefore, with aperture 51 through which drum 20 slightly projects upwards.

Operation of the means for driving and guiding sheet 1 can be inferred from the above description. With the sheet in place and pressure rollers down, sheet advance in direction X is provided through rotation of drum 20 in one direction or the other. During this paper advance, partial vacuum generated within chamber 34 perfectly presses the sheet against drum 20 and rest surface 52 in the writing area by means of the apertures 51 and 55. Moreover, walls 36 and 37 act as guiding surfaces for the paper sheet. The latter is thus guided over a great extent of its displacement distance on each side of the writing area, without sudden change in the profile shape between the horizontal part of the sheet in the writing area and the vertical parts, at the ends of the paper sheet. Such a guiding function prevents any separation of the paper sheet in the writing area, which separation could occur without guides 36 and 37, in spite of the pressure force induced by the partial vacuum, under the influence of paper-advance direction changes, and strong accelerations.

The motion of the writing head in the X direction is performed by driving the carriage in a translational motion by means of the linear motor whose inductor is formed by permanent magnets 16 fixed to face 42 of the beam and whose armature 17 is wound on the magnetic circuit 18 supported by frame 15 of carriage 12.

We claim:

1. A plotting machine comprising:
    a one piece support having two spaced apart elongated rail portions extending along a first direction, an elongated flat portion disposed between said two elongated rail portions and a tubular portion having an axis parallel to said first direction and disposed adjacent one of said elongated rail portions;
    a carriage carrying a writing head and continuously supported by said two elongated rail portions for translational movement along said first direction;
    linear motor means comprising driving means fixed on said flat surface of said support and driven means fixed to said carriage for bidirectionally driving said carriage along said first direction;
    a rotatable member mounted within said tubular portion for rotation about said axis parallel to said first direction, said rotatable member being engageable with a writing medium through an elongated opening in said tubular portion; and
    rotating motor means for bidirectionally driving said rotatable member to move said writing medium in a second direction perpendicular to said first direction, said rotating motor means having an output shaft which is directly coupled to said rotatable member.

2. A machine according to claim 1 wherein said one piece support has a slot extending along a portion of its length in said first direction to provide a passage to the writing medium between said one elongated rail portion and said tubular portion.

3. A plotting machine according to claim 1 wherein said driving means of said linear motor means comprises magnetic elements disposed as a row along said first direction on said flat surface, and said driven means comprises coil means for driving said carriage along said first direction when said coil means is fed with current.

4. A plotting machine according to claim 1 further comprising first and second rail elements attached to said two rail portions respectively along said first direction and roller means rotatably mounted on said carriage for rolling on said first and second rail elements when said carriage is moved along said first direction.

5. A plotting machine according to claim 1 further comprising means for applying first and second control signals to said linear and rotating motor means, respectively, said linear and rotating motor means being designed to have similar responses to said first and second control signals.

6. A plotting machine according to claim 1 wherein said linear and rotating motor means each comprise a brushless DC electrical motor.

7. A machine according to claim 1 wherein said tubular portion comprises a rest surface adjacent said elongated opening and further comprising means for pressing said writing medium in contact with said rotatable member, said writing medium being adapted to slide on said rest surface when pressed on said rotatable member by said pressing means.

8. A machine according to claim 1, further comprising means for generating a partial vacuum acting on the lower side of the writing medium in said tubular portion to press said writing medium on said rest surface.

9. A machine according to claim 8, further comprising guide members for the writing medium, located on each side of elongated opening of said tubular portion for guiding said writing medium from a vertical position of said writing medium in front of said tubular portion to a vertical position of said writing medium behind said tubular portion through a horizontal position where said writing medium is pressed against said rest surface.

* * * * *